US011481650B2

(12) United States Patent
Bugakova et al.

(10) Patent No.: US 11,481,650 B2
(45) Date of Patent: Oct. 25, 2022

(54) METHOD AND SYSTEM FOR SELECTING LABEL FROM PLURALITY OF LABELS FOR TASK IN CROWD-SOURCED ENVIRONMENT

(71) Applicant: YANDEX EUROPE AG, Lucerne (CH)

(72) Inventors: Nadezhda Aleksandrovna Bugakova, Saint Petersburg (RU); Valentina Pavlovna Fedorova, Sergiev Posad (RU); Alexey Valerevich Drutsa, Moscow (RU); Gleb Gennadevich Gusev, Moscow (RU)

(73) Assignee: YANDEX EUROPE AG, Lucerne (CH)

(*) Notice: Subject to any disclaimer, the term of this patent is extended or adjusted under 35 U.S.C. 154(b) by 266 days.

(21) Appl. No.: 16/906,074

(22) Filed: Jun. 19, 2020

(65) Prior Publication Data

US 2021/0133606 A1   May 6, 2021

(30) Foreign Application Priority Data

Nov. 5, 2019 (RU) .......................... RU2019135532

(51) Int. Cl.
*G06N 3/04* (2006.01)
*G06N 5/04* (2006.01)
(Continued)

(52) U.S. Cl.
CPC ............. *G06N 5/04* (2013.01); *G06F 16/285* (2019.01); *G06N 20/00* (2019.01)

(58) Field of Classification Search
CPC ......... G06N 5/04; G06N 20/00; G06F 16/285
See application file for complete search history.

(56) References Cited

U.S. PATENT DOCUMENTS 6,560,597 B1   5/2003 Dhillon et al.
7,366,705 B2   4/2008 Zeng et al.
(Continued)

FOREIGN PATENT DOCUMENTS

CN   103914478 A   7/2014
CN   104463424 A   3/2015
(Continued)

OTHER PUBLICATIONS

Crowdsourced Data Management: A Survey, Li, 2016, IEEE, pp. 2298-2316.*

(Continued)

*Primary Examiner* — Michael I Ezewoko
(74) *Attorney, Agent, or Firm* — BCF LLP

(57) ABSTRACT

There is disclosed a method system for selecting a label for a task, the method comprising: receiving a plurality of labels, each of the label included within the plurality of labels being indicative of a given assessor's perceived preference of a first object of over a second object; analyzing the comparison task to determine a set of latent biasing features; executing a MLA configured to generating a respective latent score parameter for the first object and the second object, the respective latent score parameter indicative of a probable offset between the given assessor's perceived preference and an unbiased preference parameter of the first object over the second object; generating a predicted bias degree parameter for the given assessor; generating the unbiased preference parameter; using, by the server, the unbiased preference parameter as the label for the comparison task for the given assessor.

16 Claims, 6 Drawing Sheets

(51) Int. Cl.
  *G06N 20/00* (2019.01)
  *G06F 16/28* (2019.01)

(56) References Cited

U.S. PATENT DOCUMENTS

| | | | |
|---|---|---|---|
| 7,693,738 | B2 | 4/2010 | Guinta et al. |
| 7,747,083 | B2 | 6/2010 | Tawde et al. |
| 8,266,130 | B2 | 9/2012 | Jones et al. |
| 8,498,892 | B1 | 7/2013 | Cohen et al. |
| 8,554,605 | B2 | 10/2013 | Oleson et al. |
| 8,626,545 | B2 | 1/2014 | Van et al. |
| 9,268,766 | B2 | 2/2016 | Bekkerman |
| 9,330,071 | B1 | 5/2016 | Ahmed et al. |
| 9,584,540 | B1 | 2/2017 | Chan et al. |
| 9,594,944 | B2 | 3/2017 | Kompalli et al. |
| 9,767,419 | B2 | 9/2017 | Venanzi et al. |
| 9,911,088 | B2 | 3/2018 | Nath et al. |
| 10,061,848 | B2 | 8/2018 | Basu et al. |
| 10,095,688 | B1 | 10/2018 | Schilling et al. |
| 10,162,734 | B1 | 12/2018 | Podgorny et al. |
| 10,445,671 | B2 | 10/2019 | Dubey et al. |
| 10,685,329 | B2 * | 6/2020 | Taylor .............. G06Q 10/1053 |
| 10,978,056 | B1 | 4/2021 | Challa et al. |
| 2002/0032591 | A1 | 3/2002 | Mahaffy et al. |
| 2003/0154181 | A1 | 8/2003 | Liu et al. |
| 2007/0226207 | A1 | 9/2007 | Tawde |
| 2007/0260601 | A1 | 11/2007 | Thompson et al. |
| 2008/0027913 | A1 | 1/2008 | Chang et al. |
| 2010/0153156 | A1 | 6/2010 | Guinta et al. |
| 2010/0293026 | A1 | 11/2010 | Vojnovic et al. |
| 2011/0173183 | A1 | 7/2011 | Dasdan et al. |
| 2011/0313801 | A1 | 12/2011 | Biewald et al. |
| 2012/0005131 | A1 | 1/2012 | Horvitz et al. |
| 2012/0131572 | A1 | 5/2012 | Shae et al. |
| 2012/0150579 | A1 | 6/2012 | De Wit et al. |
| 2012/0265573 | A1 | 10/2012 | Van et al. |
| 2013/0006717 | A1 | 1/2013 | Oleson et al. |
| 2013/0029769 | A1 | 1/2013 | Lee et al. |
| 2013/0096968 | A1 | 4/2013 | Van Pelt et al. |
| 2013/0111488 | A1 | 5/2013 | Gatti et al. |
| 2013/0159292 | A1 | 6/2013 | Larlus et al. |
| 2013/0231969 | A1 | 9/2013 | Van et al. |
| 2014/0122188 | A1 | 5/2014 | Van Pelt et al. |
| 2014/0172767 | A1 | 6/2014 | Chen et al. |
| 2014/0278634 | A1 | 9/2014 | Horvitz et al. |
| 2014/0343984 | A1 | 11/2014 | Shahabi et al. |
| 2014/0355835 | A1 | 12/2014 | Rodriguez-Serrano et al. |
| 2015/0004465 | A1 | 2/2015 | Basu et al. |
| 2015/0074033 | A1 | 3/2015 | Shah et al. |
| 2015/0086072 | A1 | 3/2015 | Kompalli et al. |
| 2015/0178529 | A1 | 6/2015 | Dai et al. |
| 2015/0213392 | A1 | 7/2015 | Kittur et al. |
| 2015/0254593 | A1 | 9/2015 | Ramos et al. |
| 2015/0254596 | A1 | 9/2015 | Nayar et al. |
| 2015/0254785 | A1 | 9/2015 | Yang et al. |
| 2015/0262111 | A1 | 9/2015 | Yu et al. |
| 2015/0317582 | A1 | 11/2015 | Nath et al. |
| 2015/0347519 | A1 | 12/2015 | Hornkvist et al. |
| 2015/0356488 | A1 | 12/2015 | Eden et al. |
| 2015/0356489 | A1 | 12/2015 | Kazai et al. |
| 2015/0363741 | A1 | 12/2015 | Chandra et al. |
| 2016/0041849 | A1 | 2/2016 | Naveh et al. |
| 2016/0100000 | A1 | 4/2016 | Dey et al. |
| 2016/0132815 | A1 | 5/2016 | Itoko et al. |
| 2016/0140477 | A1 | 5/2016 | Karanam et al. |
| 2016/0210570 | A1 | 7/2016 | Lee et al. |
| 2016/0232221 | A1 | 8/2016 | Mccloskey et al. |
| 2016/0035785 | A1 | 12/2016 | Fan et al. |
| 2017/0011077 | A1 | 1/2017 | Kypreos et al. |
| 2017/0024931 | A1 | 1/2017 | Sheffer et al. |
| 2017/0046794 | A1 | 2/2017 | Shukla et al. |
| 2017/0052761 | A1 | 2/2017 | Gunshor et al. |
| 2017/0061341 | A1 | 3/2017 | Haas et al. |
| 2017/0061356 | A1 | 3/2017 | Haas et al. |
| 2017/0061357 | A1 | 3/2017 | Dubey et al. |
| 2017/0103451 | A1 | 4/2017 | Alipov et al. |
| 2017/0154313 | A1 | 6/2017 | Duerr et al. |
| 2017/0185944 | A1 | 6/2017 | Volkov et al. |
| 2017/0200101 | A1 | 7/2017 | Kumar et al. |
| 2017/0220973 | A1 | 8/2017 | Byham et al. |
| 2017/0228749 | A1 | 8/2017 | Larvol et al. |
| 2017/0293859 | A1 * | 10/2017 | Gusev .............. G06F 16/24578 |
| 2017/0309193 | A1 | 10/2017 | Joseph et al. |
| 2017/0353477 | A1 | 12/2017 | Faigon et al. |
| 2017/0372225 | A1 | 12/2017 | Foresti et al. |
| 2018/0005077 | A1 | 1/2018 | Wang et al. |
| 2018/0144283 | A1 | 5/2018 | Freitas et al. |
| 2018/0144654 | A1 | 5/2018 | Olsen |
| 2018/0196579 | A1 | 7/2018 | Standefer et al. |
| 2018/0331897 | A1 | 11/2018 | Zhang et al. |
| 2018/0357286 | A1 | 12/2018 | Wang et al. |
| 2019/0258985 | A1 | 8/2019 | Guastella et al. |
| 2019/0318291 | A1 | 10/2019 | Diriye et al. |
| 2020/0327582 | A1 | 10/2020 | Fedorova et al. |
| 2020/0372338 | A1 | 11/2020 | Woods et al. |

FOREIGN PATENT DOCUMENTS

| | | |
|---|---|---|
| CN | 105608318 A | 5/2016 |
| CN | 106203893 A | 12/2016 |
| CN | 106327090 A | 1/2017 |
| CN | 106446287 A | 2/2017 |
| CN | 106557891 A | 4/2017 |
| CN | 107767055 A | 3/2018 |
| CN | 107767058 A | 3/2018 |
| CN | 107909262 A | 4/2018 |
| CN | 104794573 B | 5/2018 |
| CN | 109272003 A | 1/2019 |
| CN | 109670727 A | 4/2019 |
| CN | 110020098 A | 7/2019 |
| CN | 110503396 A | 11/2019 |
| CN | 110909880 A | 3/2020 |
| CN | 110928764 A | 3/2020 |
| CN | 111191952 A | 5/2020 |
| CN | 111291973 A | 6/2020 |
| CN | 111723930 A | 9/2020 |
| EP | 3438897 A1 | 2/2019 |
| KR | 102155790 B1 | 9/2020 |
| KR | 102156582 B1 | 9/2020 |
| RU | 2672171 C1 | 11/2018 |
| WO | 0010296 A2 | 2/2000 |
| WO | 2017222738 A1 | 12/2017 |

OTHER PUBLICATIONS

Latent Distribution Assumption for Unbiased and Consistent Consensus Modelling, Federova, 2019, arXiv, sections 1-11.*
Aggregation of pairwise comparisons with reduction of biases, Bugakova, 2019, arXiv, sections 1-7.*
Scalable Bayesian Preference Learning for Crowds, Simpson, 2019, arXiv, pp. 1-27.*
Office Action issued in respect of the related U.S. Appl. No. 16/852,512.
Yu, "Software Crowdsourcing Task Allocation Algorithm Based on Dynamic Utility", IEEE Access (vol. 7) pp. 33094-33106, Published Mar. 13, 2019.
Huang, "Enhancing reliability using peer consistency evaluation in human computation". Published Mar. 18, 2013 in CSCW 2013—Proceedings of the 2013 ACM Conference on Computer Supported Cooperative Work (pp. 639-647). Proceedings of the ACM Conference on Computer Supported Cooperative Work, CSCW). https://doi.org/10.1145/2441776.2441847.
Qiu, "CrowdEval: A Cost-Efficient Strategy to Evaluate Crowdsourced Worker's Reliability", AAMAS '18: Proceedings of the 17th International Conference on Autonomous Agents and MultiAgent Systems, Jul. 2018, pp. 1486-1494.
Hung, "An Evaluation of Aggregation Techniques in Crowdsourcing", Web Information Systems Engineering—WISE 2013, 2013, vol. 8181, ISBN: 978-3-642-41153-3.
Vaibhav B. Sinha et al., "Fast Dawid-Skene: A Fast Vote Aggregation Scheme for Sentiment Classification", Department of Com-

(56) References Cited

OTHER PUBLICATIONS puter Science and Engineering, Indian Institute of Technology Hyderabad, Telangana, Sep. 7, 2018; https://arxiv.org/abs/1803.02781.

Hongwei Li et al., "Error Rate Bounds in Crowdsourcing Models", Department of Statistics, UC Berkeley, Department of EECS, UC Berkeley and Microsoft Research, Redmond, Jul. 10, 2013. https://arxiv.org/pdf/1307.2674.pdf.

Hongwei Li et al., "Error Rate Bounds and Iterative Weighted Majority Voting for Crowdsourcing", University of California, Berkeley, Nov. 15, 2014; https://arxiv.org/pdf/1411.4086.pdf.

Hideaki et al., "Analysis of Minimax Error Rate for Crowdsourcing and Its Application to Worker Clustering Model", https://arxiv.org/pdf/1802.04551.pdf Jun. 9, 2018.

Changbo et al., "Online Crowdsourcing", https://arxiv.org/abs/1512.02393, Submitted on Dec. 8, 2015 (v1), last revised Feb. 8, 2019 (this version, v2).

Vikas et al., "Eliminating Spammers and Ranking Annotators for Crowdsourced Labeling Tasks", Journal of Machine Learning Research 13 (2012)491-518; http://www.jmlr.org/papers/volume13/raykar12a/raykar12a.pdf.

Feldman et al., "Behavior-Based Quality Assurance in Crowdsourcing Markets", Zurich Open Repository and Archive, University of Zurich, 2014. https://www.zora.uzh.ch/id/eprint/98779/1/Feldman.pdf.

Lease, "On Quality Control and Machine Learning in Crowdsourcing", School of Information, University of Texas at Austin; 2011, https://www.ischool.utexas.edu/~ml/papers/lease-hcomp11.pdf.

Gadiraju, "Understanding Malicious Behavior in Crowdsourcing Platforms: The Case of Online Surveys", http://eprints.whiterose.ac.uk/95877/1/Understanding%20malicious%20behaviour.pdf;2015 https://doi.org/10.1145/2702123.2702443.

Carsten Eickhoff, "Cognitive Biases in Crowdsourcing", Dept. of Computer Science, Zurich, Switzerland, 2018, https://brown.edu/Research/AI/files/pubs/wsdm18.pdf.

Ece Kamar, "Identifying and Accounting for Task-Dependent Bias in Crowdsourcing", Microsoft Research, Redmond, WA, USA, 2015. http://erichorvitz.com/hcomp_2015_learning_bias.pdf.

D. Sánchez-Charles, "Worker ranking determination in crowdsourcing platforms using aggregation functions," 2014 IEEE International Conference on Fuzzy Systems (FUZZ-IEEE), Beijing, 2014, pp. 1801-1808.

Khazankin, "QOS-Based Task Scheduling in Crowdsourcing Environments", Distributed Systems Group, Vienna University of Technology, Argentinierstrasse 8/184-1, A-1040 Vienna, Austria, 2011.

Yuen, "Task recommendation in crowdsourcing systems", Crowdkdd '12 Proceedings of The First International Workshop on Crowdsourcing and Data Mining, pp. 22-26, Beijing, China, Aug. 2012.

Russian Search Report dated Jan. 15, 2021 issued in respect of the counterpart Russian Patent Application No. RU2019116267.

Russian Search Report dated Dec. 16, 2020 issued in respect of the counterpart Russian Patent Application No. RU2019111283.

Ustalov "Towards the Automated Collaborative Process for Language Resource Construction", Inzhenernyy vestnik Dona Journal, Issue No. 1(48), Published Mar. 20, 2018.

P. Radha et al. "An EREC framework for e-contract modeling, enactment and monitoring", published on Oct. 2004, Data & Knowledge Engineering, vol. 51, Issue 1, pp. 31-58, https://doi.org/10.1016/j.datak.2004.03.006.

Thorsten et al. "A Collaborative Document Management Environment for Teaching and Learning", published on Jan. 2000, CVE, San Francisco, pp. 197-198 DOI:10.1145/351006.351044.

Office Action dated May 12, 2022 in respect of the related U.S. Appl. No. 16/832,095.

Notice of Allowance dated May 16, 2022 received in respect of a related U.S. Appl. No. 16/777,790.

Notice of Allowance dated Jun. 1, 2022 in respect of the related U.S. Appl. No. 16/503,977.

\* cited by examiner

METHOD AND SYSTEM FOR SELECTING LABEL FROM PLURALITY OF LABELS FOR TASK IN CROWD-SOURCED ENVIRONMENT

CROSS-REFERENCE

The present application claims priority to Russian Patent Application No. 2019135532, entitled "Method and System for Selecting Label from Plurality of Labels for Task in Crowd-Sourced Environment", filed Nov. 5, 2019, the entirety of which is incorporated herein by reference.

FIELD

The present technology relates to methods and systems for selecting a label from a plurality of labels for a task, and more particularly methods and systems for selecting a label from a plurality of labels for a task in a crowd-sourced environment.

BACKGROUND

Machine learning algorithms require a large amount of labelled data for training. Crowd-sourced platforms, such as the Amazon Mechanical Turk™, make it possible to obtain large data sets of labels in a shorter time, as well as at a lower cost, compared to that needed for a limited number of experts.

However, it is known that assessors typically available on the crowd-sourced platforms are generally non-professional and vary in levels of expertise, and therefore the obtained labels are much noisier than those obtained from experts.

There are several known sources of noise in a crowd-sourced environment. For example, a most studied kind of noise appears in multi-classification tasks, where assessors can confuse classes. Another type of noise is the automated bots, or spammers, that execute as many tasks as possible to increase revenue, which may decrease the overall quality of the results.

The article entitled "*Cognitive Biases in Crowdsourcing*", published in Proceedings of WSDM 2018: The Eleventh ACM International Conference on Web Search and Data Mining (WSDM 2018), in February 2018 by Carsten Eickhoff, investigates the prevalence and effect size of a range of common cognitive biases on a standard relevance judgment task. The article concentrates on four common types of bias and, in a series of experiments on well-known TREC research corpora, demonstrate the detrimental influence that biased label collection can have on label quality, retrieval system evaluation and ranker training.

The article entitled "*Identifying and Accounting for Task-Dependent Bias in Crowdsourcing*" published in 2015 by Ece Kamar et al., and copyright owned by the Association for the Advancement of Artificial Intelligence (AAAI), evaluates the probabilistic models that can detect and correct task-dependent bias automatically.

United States Patent Application Publication No. 2017/0309193 A1 published Oct. 26, 2017, to Regina Josseph et al. and titled "Systems and Methods for Bias-Sensitive Crowd-Sourced Analytics", discloses a bias-sensitive crowd-sourced analytic system that provides a collaborative, moderated, computer-mediated environment that includes integrated evaluation of analytical skill and cognitive de-biasing training; a simple, binary blue-team/red-team format that incorporates teaming and dedicated devil's advocacy; and accountability through quantitative scoring of reasoning, responses and associated confidence levels.

SUMMARY

Non-limiting embodiments of the present technology have been developed based on developers' appreciation of at least one technical problem associated with the prior art solutions.

In developing the present technology, developers of the present technology have appreciated the presence of a novel type of noise within the crowd-sourced environment. This novel type of noise results from a type of bias of a human assessor that is irrelevant to the task at hand, but nevertheless affects the judgment of the human assessor. For example, in a crowd-sourced environment, non-professional workers may unconsciously be affected by (due to perceptual reasons) the background design of each document, the font (and size thereof) of the instructions of the documents, position of the documents, and the like, and may thus provide biased answers. In other words, biased results demonstrate the reaction of workers to features of a given task, rather than reflecting the true preference over items in the task.

According to a first broad aspect of the present technology, there is disclosed a computer-implemented method for selecting a label from a plurality of labels received for a comparison task executed within a computer-implemented crowd-sourced environment, the method being executed by a server, the method comprising: receiving, by the server, the plurality of labels having been selected by a plurality of assessors of the computer-implemented crowd-sourced environment, each of the label included within the plurality of labels being indicative of a given assessor's perceived preference of a first object of the comparison task over a second object of the comparison task; analyzing, by the server, the comparison task to determine a set of latent biasing features associated with the first object and the second object, the set of latent biasing features comprising one or more latent features within the comparison task having a possibility of affecting preference perception of the first object over the second object by at least a portion of the plurality of human assessors; executing, by the server a Machine Learning Algorithm (MLA), the MLA configured to, for the given assessor of the plurality of human assessors: generating a respective latent score parameter for the first object and the second object, the respective latent score parameter indicative of a probable offset between the given assessor's perceived preference and an unbiased preference parameter of the first object over the second object, the probable offset being due to at least some of the set of latent biasing features; generating a predicted bias probability parameter for the given assessor, the predicted bias probability parameter being indicative of a probability that the given assessor's perceived preference is one of biased and unbiased; generating a predicted bias degree parameter for the given assessor, the predicted bias degree parameter being indicative of a degree of bias that the given assessor has towards the set of latent biasing features; generating the unbiased preference parameter based on a logistic function of the respective latent score parameters; wherein the generating the respective latent score parameters, the predicted bias probability parameter, and the predicted bias degree parameter being done based on maximum likelihood of the given assessor's perceived preference being biased as a function of the respective latent score parameters, the predicted bias probability parameter and the predicted bias degree parameter; using, by the server, the unbiased preference parameter as the label for the comparison task for the given assessor.

In some non-limiting embodiments of the method, the MLA is configured to execute generating the respective latent score parameters, the predicted bias probability parameter and the predicted bias degree parameter based on a logarithmic formula:

$$\mathcal{L} = \sum_{(w_k, d_i, d_j) \in P}^{\infty} \log[f(\gamma_k) f(s_i - s_j) + (1 - f(\gamma_k)) f(<x_{kij}, r_k>)]$$

wherein: L is a likelihood of observed comparison under the generative process based on the latent score parameters of objects, bias probability parameter and bias degree parameter for each assessors, $w_k$ is the given assessor; $d_i$ is the first object from the comparison task for the given assessor $w_k$ which was preferred over the second object $d_j$; P is the plurality of labels selected by the plurality of assessors; $Y_k$ is the predicted bias probability parameter; $s_i$ and $s_j$ correspond to the latent score parameters of the first and second object respectively, the unbiased preference parameter being the logistic function of their difference; $x_{kij}$ is the set of latent biasing features; and $r_k$ is the predicted bias degree parameter.

In some non-limiting embodiments of the method, the MLA is further configured to maximize the logarithmic formula by maximizing formula:

$$T = \mathcal{L} + \lambda R = \sum_{(w_k, d_i, d_j) \in P}^{\infty} \log(f(\gamma_k) f(s_i - s_j) + (1 - f(Y_k)) f(\langle x_{kij}, r_k \rangle)) + \lambda \sum_{i=1}^{N} \log(f(s_i - s_0)) + \log(f(s_0 - s_i))$$

wherein: T is a target function that is maximized; Λ is a regularization parameter; R is a regularization term; $S_o$ is a latent score parameter of a virtual object.

In some non-limiting embodiments of the method, the comparison task is a pairwise comparison task.

In some non-limiting embodiments of the method, the analyzing the comparison task is executed prior to receiving the plurality of labels.

In some non-limiting embodiments of the method, the set of latent biasing features include at least one of: a font size associated with the first object and the second object respectively; an image size associated with the first object and the second object respectively; and a positioning associated with the first object and the second object respectively.

In some non-limiting embodiments of the method, the method further comprising: for a given latent biasing feature included within the set of latent biasing feature, generating a latent feature vector, the latent feature vector being indicative of at least one of: a presence of the given latent feature within the comparison task; absence of the given latent feature within the comparison task.

In some non-limiting embodiments of the method, the given latent biasing feature within the set of latent biasing features $x_{kij}$ corresponds to: a first value if the given latent feature is present within the first object only; a second value if the given latent feature is present within the second object only; a third value if the given latent feature is present within both, or absent in both the first object and the second object.

In some non-limiting embodiments of the method, the unbiased preference parameter is indicative of an actual preference of the given assessor that is not affected by the set of latent biasing features.

In some non-limiting embodiments of the method, the method further comprising aggregating one or more unbiased preference parameters each associated with a respective assessor of the plurality of human assessors.

In some non-limiting embodiments of the method, the MLA is a first MLA, and the method further comprising using the aggregated one or more unbiased preference parameters for training a second MLA.

In some non-limiting embodiments of the method, which one of the set of latent biasing feature has the possibility of affecting preference perception of the first object over the second object is a priori unknown.

In accordance with another broad aspect of the present technology, there is disclosed a system for selecting a label from a plurality of labels received for a comparison task executed within a computer-implemented crowd-sourced environment, the system comprising a server, the server comprising a processor configured to: receive the plurality of labels having been selected by a plurality of assessors of the computer-implemented crowd-sourced environment, each of the label included within the plurality of labels being indicative of a given assessor's perceived preference of a first object of the comparison task over a second object of the comparison task; analyze the comparison task to determine a set of latent biasing features associated with the first object and the second object, the set of latent biasing features comprising one or more latent features within the comparison task having a possibility of affecting preference perception of the first object over the second object by at least a portion of the plurality of human assessors; execute a Machine Learning Algorithm (MLA), the MLA configured to, for the given assessor of the plurality of human assessors: generate a respective latent score parameter for the first object and the second object, the respective latent score parameter indicative of a probable offset between the given assessor's perceived preference and an unbiased preference parameter of the first object over the second object, the probable offset being due to at least some of the set of latent biasing features; generate a predicted bias probability parameter for the given assessor, the predicted bias probability parameter being indicative of a probability that the given assessor's perceived preference is one of biased and unbiased; generate a predicted bias degree parameter for the given assessor, the predicted bias degree parameter being indicative of a degree of bias that the given assessor has towards the set of latent biasing features; generate the unbiased preference parameter based on a logistic function of the respective latent score parameters; wherein the generating the respective latent score parameters, the predicted bias probability parameter, and the predicted bias degree parameter being done based on maximum likelihood of the given assessor's perceived preference being biased as a function of the respective latent score parameters, the predicted bias probability parameter and the predicted bias degree parameter; use the unbiased preference parameter as the label for the comparison task for the given assessor.

In some non-limiting embodiments of the system, the MLA is configured to generate the respective latent score parameters, the predicted bias probability parameter and the predicted bias degree parameter based on a logarithmic formula:

$$\mathcal{L} = \sum_{(w_k, d_i, d_j) \in P}^{\infty} \log[f(\gamma_k)f(s_i - s_j) + (1 - f(\gamma_k))f(<x_{kij}, r_k>)]$$

wherein: L is a likelihood of observed comparison under the generative process based on the latent score parameters of objects, bias probability parameter and bias degree parameter for each assessors, $w_k$ is the given assessor; $d_i$ is the first object from the comparison task for the given assessor $w_k$ which was preferred over the second object $d_j$; P is the plurality of labels selected by the plurality of assessors; $Y_k$ is the predicted bias probability parameter; $s_i$ and $s_j$ correspond to the latent score parameter of the first and second object respectively, the unbiased preference parameter being the logistic function of their difference; $x_{kij}$ is the set of latent biasing features; and $r_k$ is the predicted bias degree parameter.

In some non-limiting embodiments of the system, the MLA is further configured to maximize the logarithmic formula by maximizing formula:

$$T = \mathcal{L} + \lambda R = \sum_{(w_k, d_i, d_j) \in P}^{\infty} \log(f(\gamma_k)f(s_i - s_j) + (1 - f(Y_k))f(\langle x_{kij}, r_k \rangle)) + \lambda \sum_{i=1}^{N} \log(f(s_i - s_0)) + \log(f(s_0 - s_i))$$

wherein: T is a target function that is maximized; Λ is a regularization parameter; R is a regularization term; $S_o$ is a latent score parameter of a virtual object.

In some non-limiting embodiments of the system, the comparison task is a pairwise comparison task.

In some non-limiting embodiments of the system, the processor is configured to analyze the comparison task prior to receiving the plurality of labels.

In some non-limiting embodiments of the system, the set of latent biasing features include at least one of: a font size associated with the first object and the second object respectively; an image size associated with the first object and the second object respectively; and a positioning associated with the first object and the second object respectively.

In some non-limiting embodiments of the system, the processor being further configure to: for a given latent biasing feature included within the set of latent biasing feature, generate a latent feature vector, the latent feature vector being indicative of at least one of: a presence of the given latent feature within the comparison task; absence of the given latent feature within the comparison task.

In some non-limiting embodiments of the system, the given latent biasing feature within the set of latent biasing features $x_{kij}$ corresponds to: a first value if the given latent feature is present within the first object only; a second value if the given latent feature is present within the second object only; a third value if the given latent feature is present within both, or absent in both the first object and the second object.

In some non-limiting embodiments of the system, the unbiased preference parameter is indicative of an actual preference of the given assessor that is not affected by the set of latent biasing features.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations, etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

An Appendix A is provided at the end of the present specification. The Appendix A includes a copy of a yet to be published article entitled "Aggregation of Pairwise Comparisons with Reduction of Biases". This article provides additional background information, description of implementations of the non-limiting embodiments of the present technology, as well as some additional examples. The entirety of this article is incorporated herein by reference in its entirety, in all those jurisdictions where such incorporation by reference is allowed.

DETAILED DESCRIPTION

Figure 1:
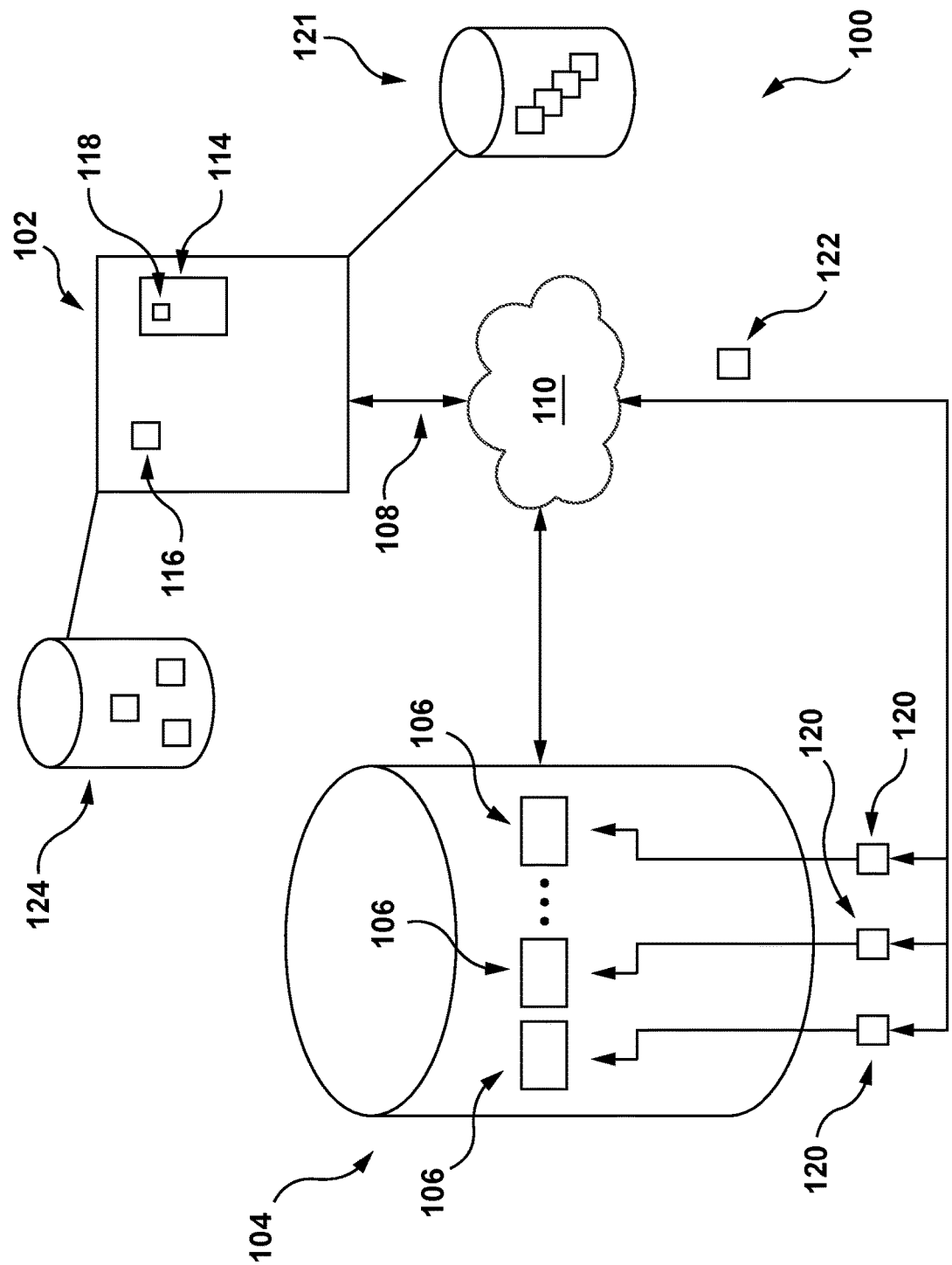
FIG. 1 depicts a schematic diagram of a system implemented in accordance with non-limiting embodiments of the present technology.

Referring to FIG. 1, there is shown a schematic diagram of a system 100, the system 100 being suitable for implementing non-limiting embodiments of the present technology. Thus, the system 100 is an example of a computer-implemented crowd-sourced environment. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication of identities of a plurality of human assessors 106, who have indicated their availability for completing at least one type of a crowd-sourced task and/or who have completed at least one crowd-sourced task in the past and/or registered for completing at least one type of the crowd-sourced task.

In some non-limiting embodiments of the present technology, the database 104 is under control and/or management of a provider of crowd-sourced services, such as Yandex LLC of Lev Tolstoy Street, No. 16, Moscow, 119021, Russia. In alternative non-limiting embodiments of the present technology, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that the database 104 can be stored at least in part at the server 102 and/or be managed at least in part by the server 102. In accordance with the non-limiting embodiments of the present technology, the database 104 comprises sufficient information associated with the identity of at least some of the plurality of human assessors 106 to allow an entity that has access to the database 104, such as the server 102, to assign and transmit one or more tasks to be completed by the one or more human assessors 106.

At any given time, the plurality of human assessors 106 may comprise a different number of human assessors 106, such as fifty human assessors 106, who are available to complete tasks. The plurality of human assessors 106 could include more or fewer human assessors 106.

The server 102 can be implemented as a conventional computer server. In an example of a non-limiting embodiment of the present technology, the server 102 can be implemented as a Dell™ PowerEdge™ Server running the Microsoft™ Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations of the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments of the present technology, the server 102 can be operated by an entity different from the one that operates the database 104.

In some non-limiting embodiments of the present technology, the server 102 is configured to execute a crowd-sourcing application 118. For example, the crowd-sourcing application 118 may be implemented as a crowd-sourcing platform such as Yandex.Toloka™ crowd-sourcing platform, or other proprietary or commercial crowd-sourcing platform.

To that end, the server 102 is communicatively coupled to a task database 121. In alternative non-limiting embodiments, the task database 121 may be communicatively coupled to the server 102 via the communication network 110. Although the task database 121 is illustrated schematically herein as a single entity, it is contemplated that the task database 121 may be configured in a distributed manner.

The task database 121 is populated with a plurality of tasks (not separately numbered), each task corresponding to a human intelligence task (also referred herein as HITs, "digital task" or simply "tasks") (not separately numbered).

How the task database 121 is populated with the plurality of tasks is not limited. Generally speaking, one or more task requesters (not shown) may submit one or more tasks to be stored in the task database 121. In some non-limiting embodiments of the present technology, the one or more task requesters may specify the type of assessors the task is destined to, and/or a budget to be allocated to each human assessor 106 providing a result.

How the task is implemented is not limited. In some non-limiting embodiments of the present technology, the task database 121 includes tasks that are comparison tasks.

Figure 2:
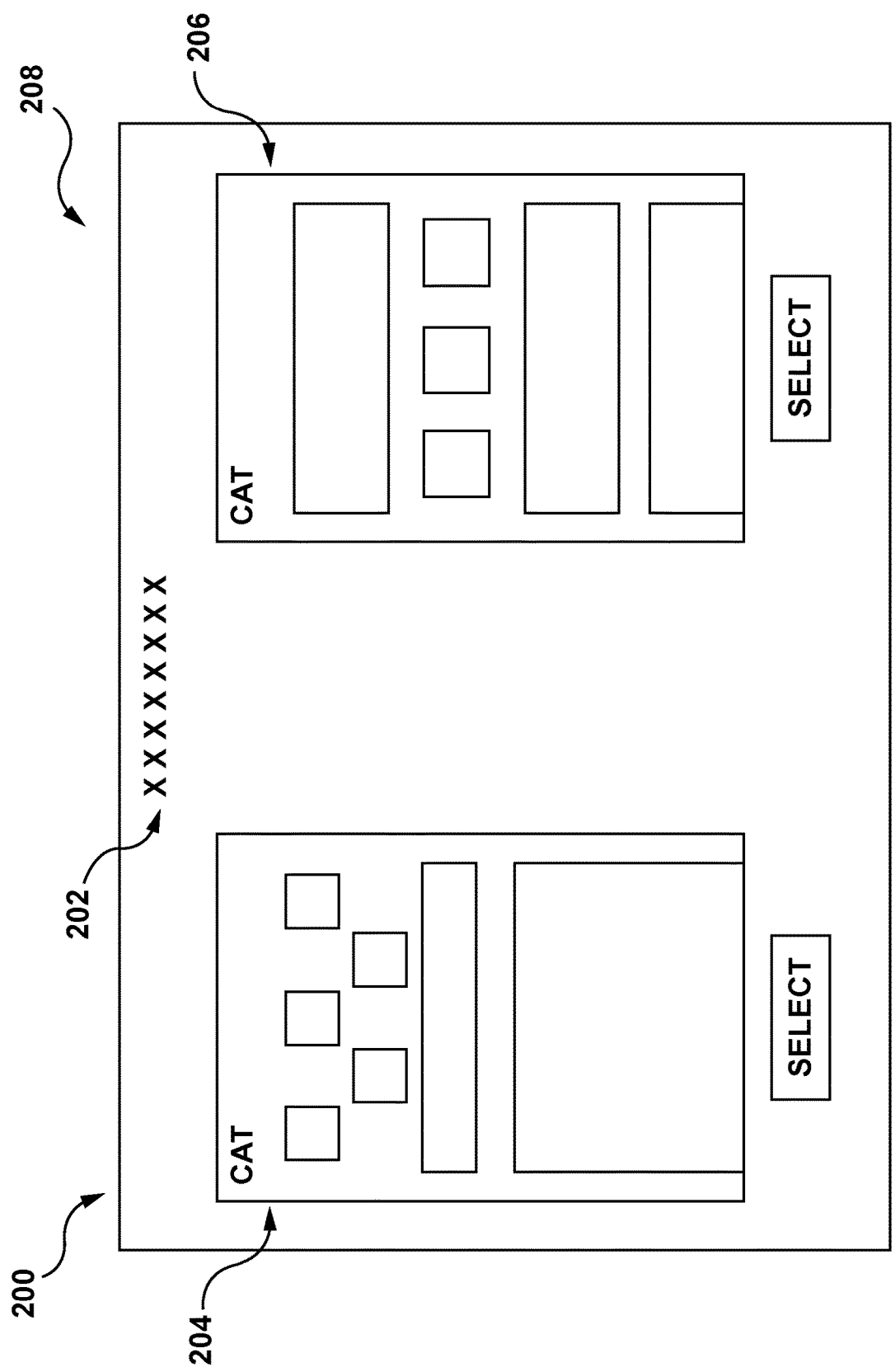
FIG. 2 depicts a screen shot of a crowd-sourced interface implemented in accordance with a non-limiting embodiment of the present technology, the interface being depicted as displayed on a screen of an electronic device of the system of FIG. 1.

A comparison task corresponds to a task in which the human assessors 106 are asked to select, via a label, a choice from at least a first choice and a second choice. With reference to FIG. 2, there is depicted a screen shot of a crowd-sourced interface 200 implemented in accordance with a non-limiting embodiment of the present technology (the example of the interface 200 depicted as displayed on the screen of one of the electronic devices 120). The interface 200 illustrates a search engine result page (SERP) pairwise comparison task 208.

The interface 200 includes instruction 202 to the human assessors 106, a first object, i.e. a first SERP 204, and a second object, i.e. a second SERP 206. For the avoidance of any doubt, it should be mentioned that text (and more specifically each letter) included within the interface 200 is represented by "X", however, in reality the text is made up of words in a given language (such as English). For example, the instruction 202 may comprise instructions to the human assessors 106 to select (i.e. label) one of the first SERP 204 and the second SERP 206 that is better responsive to a search phrase "CAT". Needless to say, other types of pairwise comparison tests are contemplated, such as the pairwise comparison of documents, images, and the like.

Returning to FIG. 1, in accordance with the non-limiting embodiments of the present technology, the crowd-sourcing application 118 is configured to assign a given task to at least a subset of the plurality of human assessors 106, which have indicated their availability in the database 104.

The server 102 is configured to communicate with various entities via the communication network 110. Examples of the various entities include the database 104, respective electronic devices 120 of the human assessors 106, and other devices that may be coupled to the communication network 110. Accordingly, the crowd-sourcing application 118 is configured to retrieve the given task from the task database 121 and send the given task to a respective electronic device 120 used by the plurality of human assessors 106 to complete the given task, via the communication network 110 for example.

It is contemplated that any suitable file transfer technology and/or medium could be used for this purpose. It is also contemplated that the task could be submitted to the plurality of human assessors 106 via any other suitable method, such as by making the task remotely available to the plurality of human assessors 106.

In accordance with the non-limiting embodiments of the present technology, the server 102 is configured to receive a set of results of the task that has been completed by the plurality of human assessors 106. In accordance with the non-limiting embodiments of the present technology, the set of results could be received by the server 102 in one or more data packets 122 over the communication network 110 for example. It is contemplated that any other suitable data transfer means could be used.

In some non-limiting embodiments of the present technology, the server 102 is further communicatively coupled to a feature database 124 via a dedicated link (not numbered). In alternative non-limiting embodiments of the present technology, the feature database 124 may be communicatively coupled to the server 102 via the communication network 110, without departing from the teachings of the present technology. Although the feature database 124 is illustrated schematically herein as a single entity, it is contemplated that the feature database 124 may be configured in a distributed manner.

In some non-limiting embodiments of the present technology, the feature database 124 is configured to store an indication of a set of latent biasing features (not separately numbered) associated with each task stored within the task database 121. In the context of the present specification, the phrase "latent biasing feature" may correspond to any feature associated with a given task that a given human assessor 106 may have a prejudice in favour of or against, which may affect the judgment of the given human assessor 106 when executing the task, but that are irrelevant to the quality of the choices provided within the task (i.e. to the assessment task at hand). In other words, the latent biasing features are those features of the task that do not (or should not) have a direct correlation to the label assigned to one of the two choice in the pair-wise task, but can nevertheless exert an effect on the human assessors 106 in their executions of the task.

For example, the set of latent features may comprise visual features associated with the task. Taking the task 208 as an example, the visual features include, but not limited to:
  The positional relationship between the first SERP 204 and the second SERP 206;
  The background colour (if any) of the first SERP 204 and the second SERP 206;
  The font size of the text included in the first SERP 204 and the second SERP 206;
  The presence of images within the first SERP 204 and the second SERP 206.

How the set of latent features is generated is not limited. For example, the set of latent features may be generated by an operator of the crowd-sourcing application 118, or automatically via the use of a machine learning algorithm, in response to the given task being submitted by a requester to the crowd-sourcing application 118.

For example, let us assume that the task 208 has 5 latent biasing features, as follows:
  The first SERP 204 is on the left side of the screen, and the second SERP is on the right side of the screen;
  The background of the first SERP 204 is white, and the second SERP 206 is not white;
  The background of the second SERP 206 has an orange background, but the background of the first SERP 204 is not orange;
  The font of both the first SERP 204 and the second SERP 206 is not Times New Roman;
  Both the first SERP 204 and the second SERP 206 contain an image.

In some non-limiting embodiments of the present technology, the feature database 124 may cause, or have access to, a function to store the set of latent biasing features as a set of latent vectors.

In other words, for a given latent biasing feature, a corresponding latent vector is generated. In some non-limiting embodiments of the present technology, the set of latent vectors has a number of dimensions corresponding to the number of latent vectors. For example, if the set of latent vectors of the task 208 has five dimensions, each latent vector associated with a respective dimension.

Figure 6:
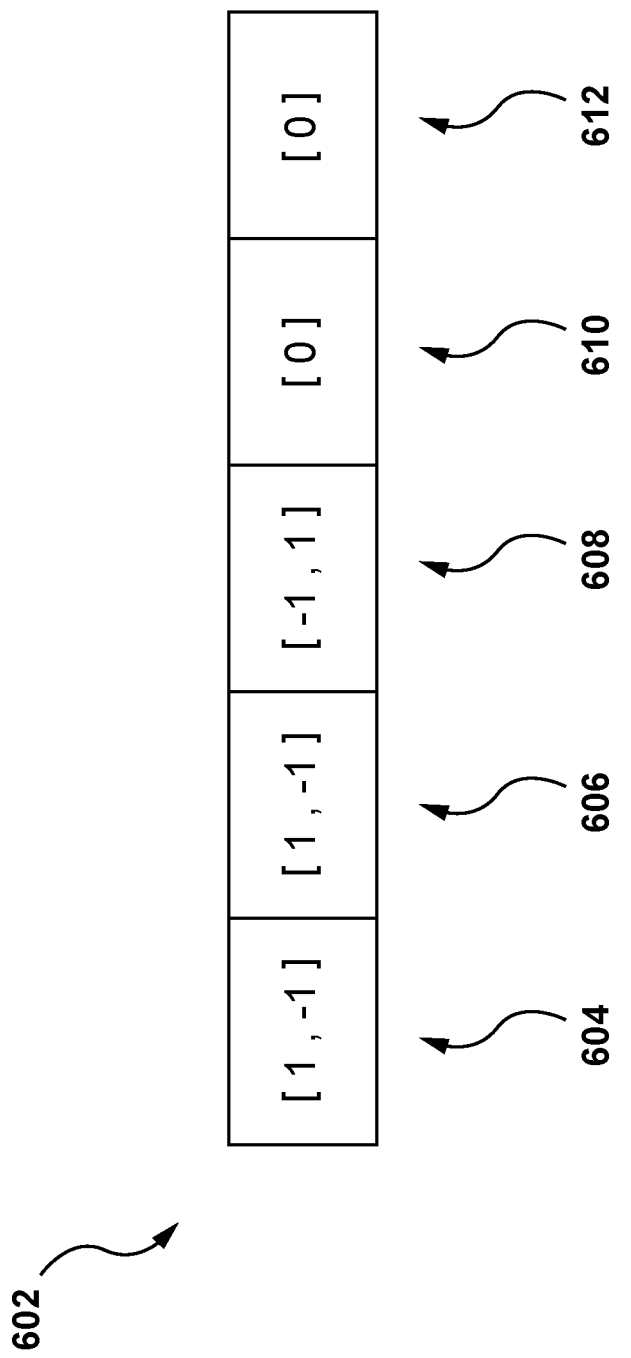
FIG. 6 depicts a schematic illustration of a set of latent vectors.

Taking a quick look at FIG. 6, there is provided a schematic illustration of a set of latent vectors 602 associated with the task 208.

The set of latent vectors 602 comprises a first latent vector 604 that is associated with a first dimension. For example, the first latent vector 604 may be associated with the latent biasing feature regarding the position of the first SERP 204 and the second SERP 206. The first latent vector 604 has a value of [1,−1], where "1" is indicative of the first SERP 204 being on the left side of the screen, and "−1" is indicative of the second SERP 206 being on the right side of the screen.

The set of latent vectors 602 further comprises a second latent vector 606 that is associated with a second dimension. For example, the second latent vector 606 may be associated with the latent biasing feature regarding the white background. Since only the first SERP 204 has a white background, and the second SERP 206 does not have a white background, the second latent vector 606 has a value of [1,−1], where the "1" is indicative of the presence of this latent biasing feature in the first SERP 204, and the "−1" is indicative of the absence of this latent biasing feature in the second SERP 206.

The set of latent vectors 602 further comprises a third latent vector 608 that is associated with a third dimension. For example, the third latent vector 608 may be associated with the latent biasing feature regarding the orange background. Since only the second SERP 206 has an orange background, and the first SERP 204 does not, the third latent vector 608 has a value of [−1,1], where the "1" is indicative of the presence of this latent biasing feature in the second SERP 206, and the "−1" is indicative of the absence of this latent biasing feature in the first SERP 204.

The set of latent vectors 602 further comprises a fourth latent vector 610 that is associated with a fourth dimension. For example, the fourth latent vector 610 may be associated with the latent biasing feature regarding the font being Times New Roman. Since both the first SERP 204 and the second SERP 206 is not Times New Roman, the fourth latent vector 610 has a value of [0], where the "0" is indicative that the first SERP 204 and the second SERP 206 do not differ with regards to this particular latent biasing feature, or in other words, this latent biasing feature will not favor the judgement of the human assessors 106 for one or the other choice (i.e. first SERP 204 and second SERP 206) when performing the task 208.

Finally, the set of latent vectors 602 further comprises a fifth latent vector 612 that is associated with a fifth dimension. For example, the fifth latent vector may be associated with the latent biasing feature regarding the presence of an image. Since both the first SERP 204 and the second SERP 206 contains an image, the fifth latent vector 612 corresponds to [0], where the "0" is indicative that first SERP 204 and the second SERP 206 do not differ with regards to this particular latent biasing feature, or in other words, this latent biasing feature will not favor the judgment of the human assessors 106 for one or the other choice (i.e. first SERP 204 and second SERP 206) when performing the task 208.

Although the description of the system 100 has been made with reference to various hardware entities (such as the database 104, the server 102, the feature database 124, the task database 121 and the like) depicted separately, it should be understood that this is done for ease of understanding. It is contemplated that the various functions executed by these various entities be executed by a single entity or be distributed among different entities.

Crowd-Sourcing Application 118

Figure 3:
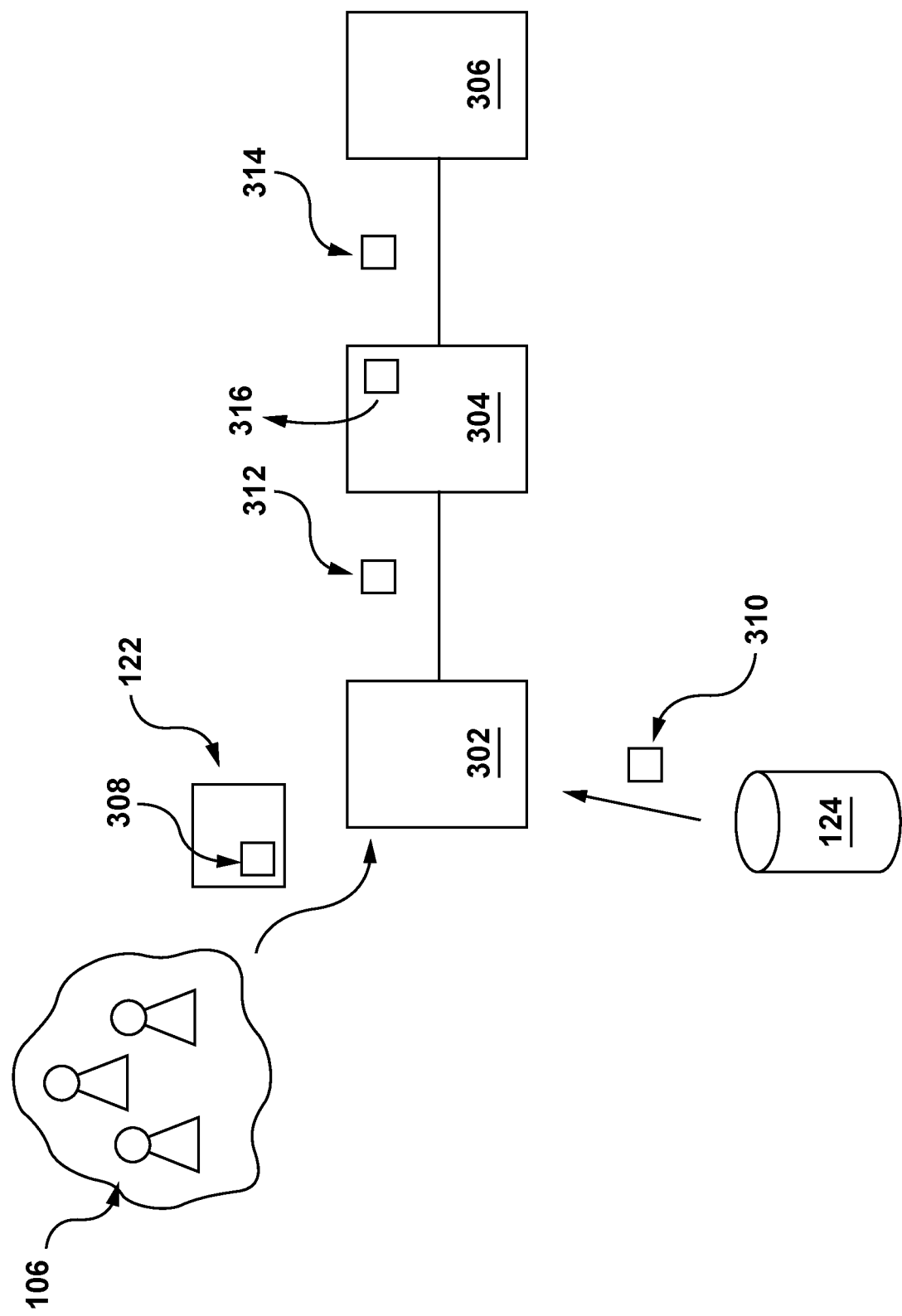
FIG. 3 depicts a schematic diagram of a process for determining a label from a plurality of labels in a crowd-sourced environment.

With reference to FIG. 3, there is depicted a schematic diagram of a process for determining a label from a plurality of labels received for a comparison task executed in a crowd-sourced environment. The process for determining the label is executed by the crowd-sourcing application 118 (see FIG. 1) implemented in accordance with a non-limiting embodiment of the present technology. The crowd-sourcing application 118 executes (or otherwise has access to): a receiving routine 302, a determination routine 304 and an output routine 306.

In the context of the present specification, the term "routine" refers to a subset of the computer executable program instructions of the crowd-sourcing application 118 that is executable by the server processor 116 (the receiving routine 302, the determination routine 304, and the output routine 306). For the avoidance of any doubt, it should be expressly understood that the receiving routine 302, the determination routine 304, and the output routine 306 are illustrated herein as separate entities for ease of explanation of the processes executed by the crowd-sourcing application 118. It is contemplated that some or all of the receiving routine 302, the determination routine 304, and the output routine 306 may be implemented as one or more combined routines.

For ease of understanding the present technology, functionality of each of the receiving routine 302, the determination routine 304, and the output routine 306, as well as data and/or information processed or stored therein are described below.

Receiving Routine 302

The receiving routine 302 is configured to receive a plurality of labels 308 from the electronic devices 120 used by the plurality of human assessors 106, via the data packet 122. Needless to say, although a single data packet 122 is shown, this is merely for ease of understanding, and it should be understood that a plurality of data packets each containing a given label from a given electronic device 120 may be received by the receiving routine 302. In some non-limiting embodiment of the present technology, the plurality of labels 308 corresponds to a plurality of labels.

Let us assume, for example, that the plurality of labels 308 is responsive to the task 208, and as such each label included within the plurality of labels 308 corresponds to either one of a first label or a second label (described in detail below).

Figure 4:
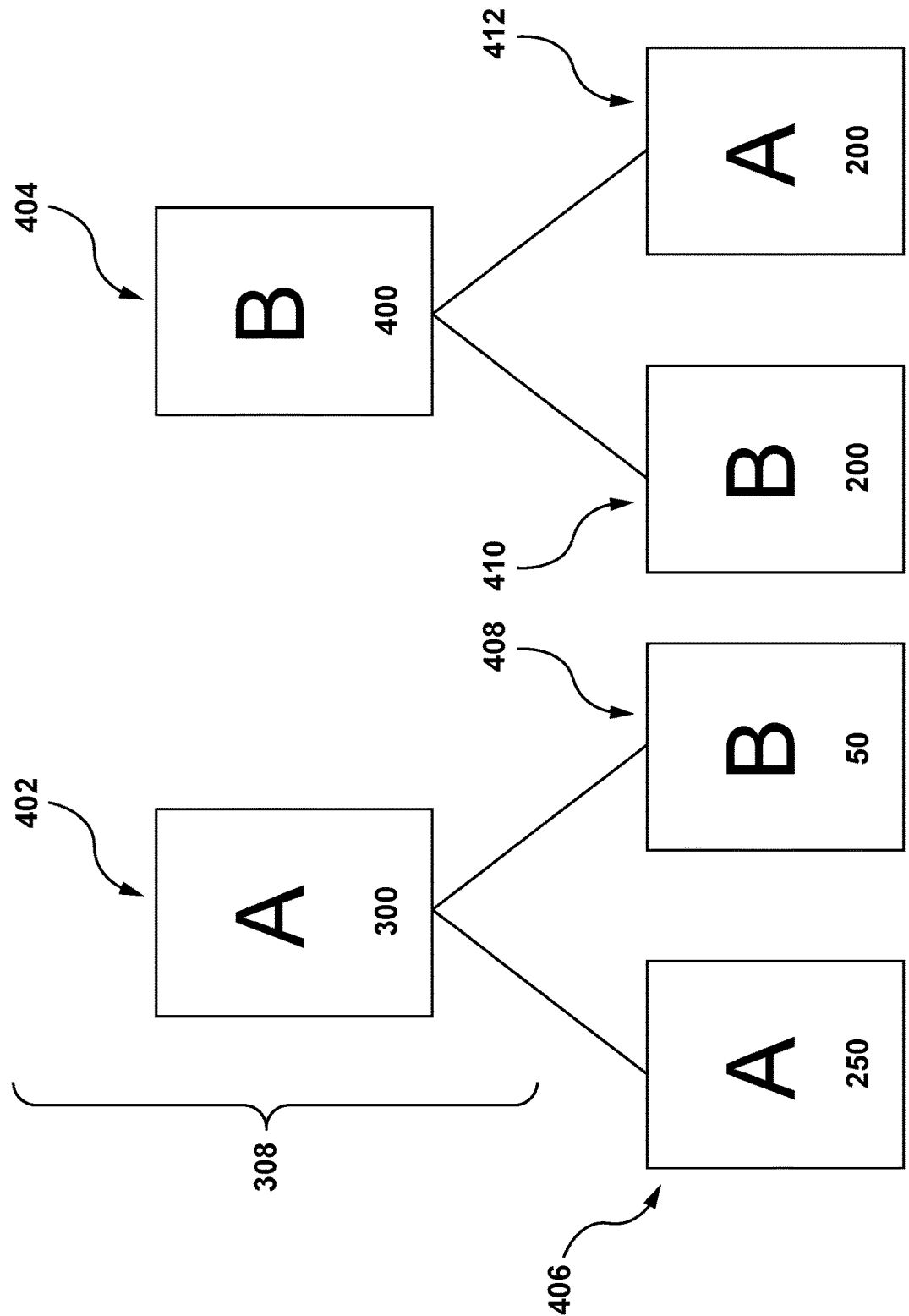
FIG. 4 depicts a schematic illustration of a plurality of labels received by the electronic devices of the system of FIG. 1.

Taking a quick look at FIG. 4, there is depicted a schematic illustration of the plurality of labels 308. Let us assume, for the purpose of explanation that the human assessors 106 have provided a respective label associated with either the first SERP 204 or the second SERP 206 as the more pertinent SERP to the search phrase "Cat".

As such, the plurality of labels 308 is made up of a number of a first label 402 which is associated with the first SERP 204 (illustrated as "A" on FIG. 4), and a number of a second label 404 which is associated with the second SERP 206 (illustrated as "B" on FIG. 4).

In the illustrated example, there are a total of 700 labels included within the plurality of labels 308. Out of the 700 labels, 300 labels correspond to the first label 402 and the rest (i.e. 400) correspond to the second label 404. In other words, 300 human assessors have selected the first SERP 204 as the more pertinent SERP, and 400 human assessors have selected the second SERP 206 as the more pertinent SERP.

Returning to FIG. 3, the receiving routine 302 is further configured to retrieve, or receive, a set of latent biasing features 310 associated with the task 208.

The receiving routine 302 is further configured to transmit a data packet 312 to the determination routine 304. The data packet 312 comprises (i) the plurality of labels 308 (ii) and the set of latent biasing features 310.

Determination Routine 304

In response to receiving the data packet 312, the determination routine 304 is configured to determine, for each given assessor within the plurality of assessors 106, a respective latent score parameter for the first SERP 204 and the second SERP 206. In some non-limiting embodiments of the present technology, the respective latent score parameter is indicative of a probable offset between the given assessor's perceived preference and an unbiased preference parameter of the first SERP 204 over the second SERP 206 (or vice-versa), the probable offset being due to at least some of the set of latent biasing features 310. In other words, the determination routine 304 is configured to determine whether human assessor 106 that selected the label was biased or unbiased, by determining the probable offset between the selected label and the unbiased preference parameter.

In some non-limiting embodiments of the present technology, the determination routine 304 is configured to determine the unbiased preference parameter by executing a machine learning algorithm (MLA) 316.

In some non-limiting embodiments of the present technology, the MLA 316 is trained to determine the unbiased preference parameter based on the respective latent score parameter for the first SERP 204 and the second SERP, a predicted bias probability parameter for the given assessor, and the predicted bias degree parameter for the given assessor.

In some non-limiting embodiments of the present technology, the predicted bias probability parameter is indicative of a probability that the given assessor's perceived preference toward the set of latent biasing features 310.

In some non-limiting embodiments of the present technology, the predicted bias degree parameter is indicative of a degree of bias that the given assessor has towards the set of latent biasing features 310.

In some non-limiting embodiments of the present technology, the MLA 316 is configured to determine the respective latent score parameter, the predicted bias probability parameter and the predicted bias degree parameter by maximizing the log-likelihood of a logarithmic formula:

$$L = \sum_{(wk,di,dj) \in P} \log(f(\Upsilon k)f(si-sj) + (1 - f(\Upsilon k))f(<x_{kij}, r_k>)) \quad \text{Formula 1}$$

where:
  L is a likelihood of observed comparison under the generative process based on the latent score parameters of the objects, bias probability parameter and bias degree parameter for each assessors;
  $w_k$ is the given assessor;
  $d_i$ is the first object from the comparison task for the given assessor $w_k$ which was preferred over the second object $d_j$;
  P is the plurality of labels selected by the plurality of assessors;
  $Y_k$ is the predicted bias probability parameter;
  $s_i$ and $s_j$ correspond to the latent score parameter of the first and second object respectively, the unbiased preference parameter being the logistic function of their difference;
  $x_{kij}$ is the set of latent biasing features; and $r_k$ is the predicted bias degree parameter.

In some non-limiting embodiments of the present technology, the MLA 316 is further configured to maximize the logarithmic formula by maximizing formula:

$$T = L + \Lambda R = \sum_{(wk,di,dj) \in P} \log(f(\gamma k)f(si-sj) + (1 - f(\gamma k))f(<x_{kij}, r_k>)) + \Lambda \sum_{i=1}^{N} \log(f(si-so)) + \log(f(so-si)) \quad \text{Formula 2}$$

where:
  T is a target function that is maximized;
  $\Lambda$ is a regularization parameter;
  R is a regularization term;
  $S_o$ is a latent score parameter of a virtual object.

In other words, through the use of Formula 1 and Formula 2, the MLA 316 is configured to estimate the predicted bias parameter and the predicted bias probability parameter, which are a priori unknown, and subsequently determine the unbiased preference parameter.

With continued reference to FIG. 4, the MLA 316 is configured to determine the unbiased preference parameter for each of the 700 assessors that selected the 300 first labels 402 and the 400 second labels 404. In other words, for each assessor, the MLA 316 is configured to determine the unbiased preference parameter, which corresponds to the unbiased label for each of the 700 human assessors 106.

In some non-limiting embodiments of the present technology, the unbiased preference parameter is represented in a binary manner, where for example, "0" corresponds to the first label 402 and "1" corresponds to the second label 404. Needless to say, it is also contemplated that other manners of expressing the unbiased preference parameter are contemplated. In some non-limiting embodiments of the present technology, the unbiased preference parameter may be implemented as a weighted value, where if there is a difference between the selected label and the unbiased preference parameter of a given assessor, the unbiased preference parameter reflects such difference. For example, if a given human assessor 106 has selected the first label 402, but its unbiased preference parameter is the second label 404, the unbiased preference parameter may correspond to the second label 404 with a weighted value of "0.5". Needless to say, it is contemplated that any other weighted value may be used.

Taking the 300 first labels 402 as an example. The MLA 316 is configured to determine the unbiased preference parameter for each of the 300 human assessors 106. In other words, the MLA 316 will output a label that corresponds to an unbiased label for each of the 300 human assessors 106.

For example, let us assume that the determined unbiased preference parameters of 250 first labels 402 corresponds to the first label 402, or in other words 250 human assessors 106 that selected the first label 402 were not biased by the set of latent biasing features 310. On the other hand, there are 50 first labels 402 have an unbiased preference parameter indicative that the 50 human assessors 106 were biased by the set of latent biasing features 310. Accordingly, the 250 first labels form a first subset 406, and the 50 first labels together form a second subset 408.

In another example, the determination routine 304 is also configured to parse the 400 second labels 404, into a third subset 410 and a fourth subset 412. The third subset 410 is made up of 200 second labels 404 selected by human assessors 106 that were not biased by the set of latent biasing features 310. The fourth subset 412 comprises 200 second labels 404 that have an unbiased preference parameter that indicatives that 200 human assessors 106 selected the second label 404 were biased by the set of latent biasing features 310.

Returning to FIG. 3, the determination routine 304 is further configured to transmit a data packet 314 to the output routine 306. The data packet 314 comprises the first subset 406, the second subset 408, the third subset 410 and the fourth subset 412.

Output Routine 306

The output routine 306 is configured to receive the data packet 314 and execute the following functions.

Firstly, the output routine 306 is configured to determine a consensus label for the comparison task 208. How the consensus label is determined is not limited. For example, the output routine 306 may execute a majority voting.

Just as an illustration, recalling that there are a total of 450 unbiased preference parameters associated with the first label 402 (the first subset 406 and the fourth subset 412), and 250 unbiased preference parameters associated with the second label 404 (the second subset 408 and the third subset 410), the output routine 306 is configured to select the first label 402 as the consensus label for the comparison task 208.

In some non-limiting embodiments of the present technology, where the unbiased preference parameters are weighted values, the majority voting may function as follows: each of the labels included in the first subset 408 and the third subset 410 has a value of "1", and the each of the labels included in the second subset 410 and fourth subset 412 has a value of "0.5". The output routine 306 is then configured to aggregate a first value corresponding to the first label 402 (250+200(0.5)=350) and a second value corresponding to the second label 404 (200+50(0.5)=225), and select the label with the highest value as the consensus label for the comparison task (i.e. the first label 402).

In some non-limiting embodiments of the present technology, the output routine 306 is then configured to transmit the consensus label and the comparison task 208 for training a machine learning algorithm (not shown).

The various non-limiting embodiments of the present technology may allow the determining the result (label) of a pairwise comparison task executed in a crowd-sourced environment.

Figure 5:
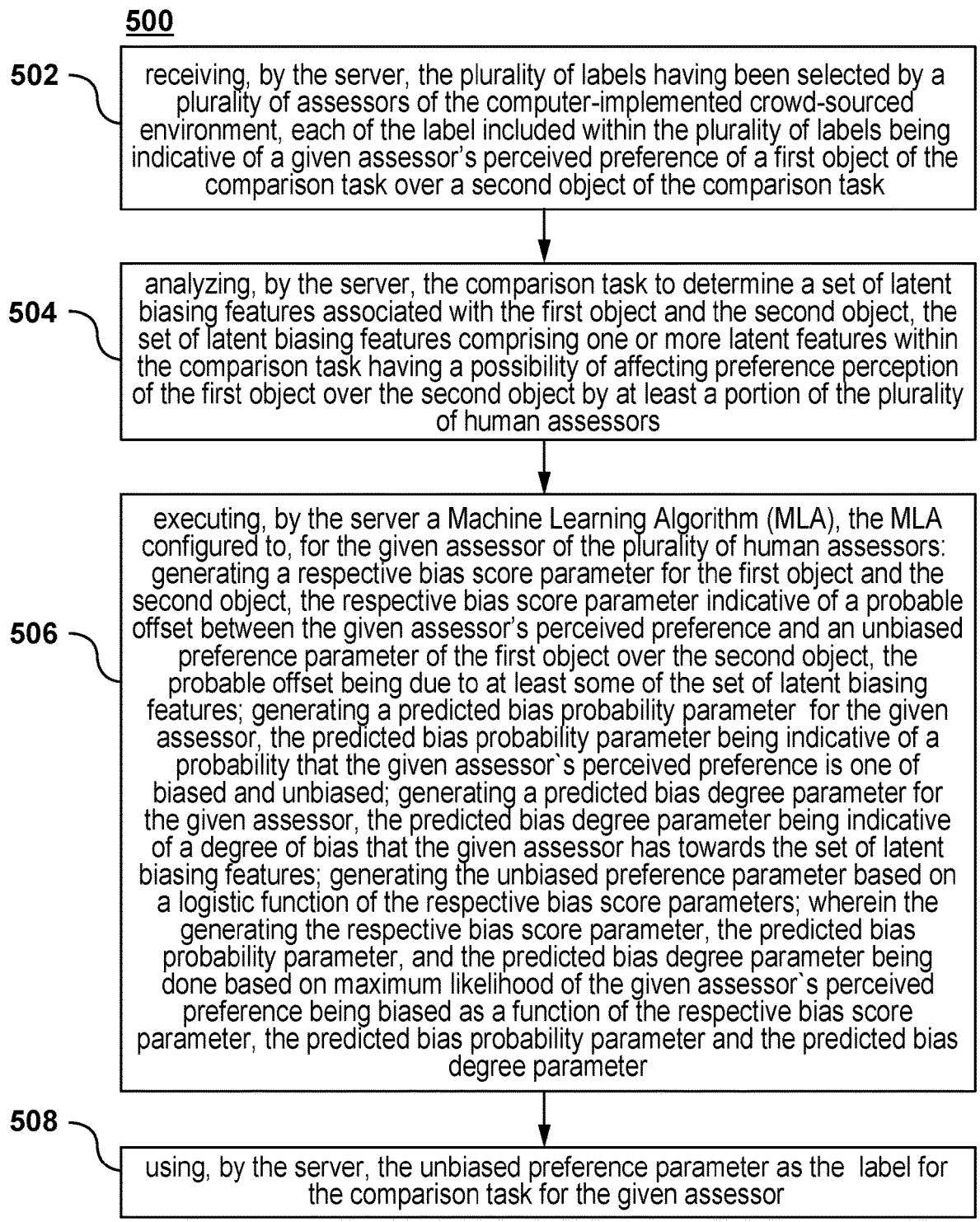
FIG. 5 depicts a block diagram of a flow chart of a method for determining a label from a plurality of labels in a crowd-sourced environment.

Given the architecture and examples provided hereinabove, it is possible to execute a computer-implemented method or determining a label of a task from a plurality of labels in a crowd-sourced environment. With reference to FIG. 5, there is depicted a flow chart of a method 500, the method 500 being executable in accordance with non-limiting embodiments of the present technology. The method 500 can be executed by the server 102.

Step 502: receiving, by the server, the plurality of labels having been selected by a plurality of assessors of the computer-implemented crowd-sourced environment, each of the label included within the plurality of labels being indicative of a given assessor's perceived preference of a first object of the comparison task over a second object of the comparison task The method 500 starts at step 502, where the receiving routine 302 receives the plurality of labels 308 from the plurality of human assessors 106 via the data packet 122.

Step 504: analyzing, by the server, the comparison task to determine a set of latent biasing features associated with the first object and the second object, the set of latent biasing features comprising one or more latent features within the comparison task having a possibility of affecting preference perception of the first object over the second object by at least a portion of the plurality of human assessors In some non-limiting embodiments of the present technology, the feature database 124 is configured to store the set of latent biasing features 310.

At step 504, the receiving routine 302 is configured to receive the set of latent biasing features 310 from the feature database 124.

Step 506: executing, by the server a Machine Learning Algorithm (MLA), the MLA configured to, for the given assessor of the plurality of human assessors: generating a respective latent score parameter for the first object and the second object, the respective latent score parameter indicative of a probable offset between the given assessor's perceived preference and an unbiased preference parameter of the first object over the second object, the probable offset being due to at least some of the set of latent biasing features; generating a predicted bias probability parameter for the given assessor, the predicted bias probability parameter being indicative of a probability that the given assessor's perceived preference is one of biased and unbiased; generating a predicted bias degree parameter for the given assessor, the predicted bias degree parameter being indicative of a degree of bias that the given assessor has towards the set of latent biasing features; generating the unbiased preference parameter based on a logistic function of the respective latent score parameters; wherein the generating the respective latent score parameter, the predicted bias probability parameter, and the predicted bias degree parameter being done based on maximum likelihood of the given assessor's perceived preference being biased as a function of the respective latent score parameter, the predicted bias probability parameter and the predicted bias degree parameter In response to receiving the data packet 312, the determination routine 304 is configured to determine, for each given assessor within the plurality of assessors 106, a respective latent score parameter for the first SERP 204 and the second SERP 206. In some non-limiting embodiments of the present technology, the respective latent score parameter is indicative of a probable offset between the given assessor's perceived preference and an unbiased preference parameter of the first SERP 204 over the second SERP 206 (or vice-versa), the probable offset being due to at least some of the set of latent biasing features 310. In other words, the determination routine 304 is configured to determine whether human assessor 106 that selected the label was biased or unbiased, by determining the probable offset between the selected label and the unbiased preference parameter.

In some non-limiting embodiments of the present technology, the determination routine 304 is configured to determine the unbiased preference parameter by executing a machine learning algorithm (MLA) 316.

In some non-limiting embodiments of the present technology, the MLA 316 is trained to determine the unbiased preference parameter based on the respective latent score parameter for the first SERP 204 and the second SERP, a predicted bias probability parameter for the given assessor, and the predicted bias degree parameter for the given assessor.

In some non-limiting embodiments of the present technology, the predicted bias probability parameter is indicative of a probability that the given assessor's perceived preference toward the set of latent biasing features 310.

In some non-limiting embodiments of the present technology, the predicted bias degree parameter is indicative of a degree of bias that the given assessor has towards the set of latent biasing features 310.

In some non-limiting embodiments of the present technology, the MLA 316 is configured to estimate the predicted bias parameter and the predicted bias probability parameter, which are a priori unknown, and subsequently determine the unbiased preference parameter using Formula 1 and Formula 2.

Step 508: using, by the server, the unbiased preference parameter as the label for the comparison task for the given assessor At step 508, the unbiased preference, parameter for a given human assessor 106 corresponds to a label that would have been selected by the given human assessor if he/she was not biased by the set of latent biasing features 310.

The method 500 then terminates.

It should be apparent to those skilled in the art that at least some embodiments of the present technology aim to expand a range of technical solutions for addressing a particular technical problem encountered by the conventional crowd-sourced technology, namely determining a result to a task within the crowd-sourced environment.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method for selecting a label from a plurality of labels received for a comparison task executed within a computer-implemented crowd-sourced environment, the method being executed by a server, the method comprising:
   receiving, by the server, the plurality of labels having been selected by a plurality of assessors of the computer-implemented crowd-sourced environment, each of the label included within the plurality of labels being indicative of a given assessor's perceived preference of a first object of the comparison task over a second object of the comparison task;
   analyzing, by the server, the comparison task to determine a set of latent biasing features associated with the first object and the second object, the set of latent biasing features comprising one or more latent features within the comparison task having a possibility of affecting preference perception of the first object over the second object by at least a portion of the plurality of human assessors;
   training a Machine Learning Algorithm (MLA) to determine an unbiased preference parameter based on a respective latent score parameter for the first object and the second object, a predicted bias probability parameter for the given assessor and a predicted bias degree parameter for the given assessor;
   executing, by the server, the MLA, wherein the MLA is configured to, for the given assessor of the plurality of human assessors a generative process comprising:
      generating the respective latent score parameter for the first object and the second object, the respective latent score parameter indicative of a probable offset between the given assessor's perceived preference and an unbiased preference parameter of the first object over the second object, the probable offset being due to at least some of the set of latent biasing features;
      generating the predicted bias probability parameter for the given assessor, the predicted bias probability parameter being indicative of a probability that the given assessor's perceived preference is one of biased and unbiased;
      generating the predicted bias degree parameter for the given assessor, the predicted bias degree parameter being indicative of a degree of bias that the given assessor has towards the set of latent biasing features; wherein
      the MLA is trained to generate the respective latent score parameters, the predicted bias probability parameter and the predicted bias degree parameter based on a logarithmic formula:

$$\mathcal{L} = \sum_{(w_k, d_i, d_j) \in P}^{\infty} \log[f(\gamma_k) f(s_i - s_j) + (1 - f(\gamma_k)) f(\langle x_{kij}, r_k \rangle)]$$

wherein:
   L is a likelihood of observed comparison under the generative process based on the latent score parameter of the objects, bias probability parameter and bias degree parameter for each assessor;
   $w_k$ is the given assessor;
   $d_i$ is the first object from the comparison task for the given assessor $w_k$ which was preferred over the second object $d_j$;
   P is the plurality of labels selected by the plurality of assessors;
   $\gamma_k$ is the predicted bias probability parameter;
   $s_i$ and $s_j$ correspond to the latent score parameter of the first and second object respectively, the unbiased preference parameter being a logistic function of their difference;
   $x_{kij}$ is the set of latent biasing features;
   $r_k$ is the predicted bias degree parameter; wherein
   maximizing the logarithmic formula by maximizing formula:

$$T = \mathcal{L} + \lambda R = \sum_{(w_k, d_i, d_j) \in P}^{\infty} \log[f(\gamma_k) f(s_i - s_j) + (1 - f(Y_k)) f(\langle x_{kij}, r_k \rangle)] + \lambda \sum_{i=1}^{N} \log(f(s_i - s_0)) + \log(f(s_0 - s_i))$$

wherein:
   T is a target function that is maximized;
   λ is a regularization parameter;
   R is a regularization term;
   $s_o$ is a latent score parameter of a virtual object; and
   generating the unbiased preference parameter based on the logistic function of the respective latent score parameters;
   using, by the server, the unbiased preference parameter as the label for the comparison task for the given assessor.

2. The method of claim 1, wherein the comparison task is a pairwise comparison task.

3. The method of claim 1, wherein the analyzing the comparison task is executed prior to receiving the plurality of labels.

4. The method of claim 1, wherein the set of latent biasing features include at least one of:
   a font size associated with the first object and the second object respectively;

an image size associated with the first object and the second object respectively; and a positioning associated with the first object and the second object respectively.

5. The method of claim 4, the method further comprising:
for a given latent biasing feature included within the set of latent biasing feature, generating a latent feature vector, the latent feature vector being indicative of at least one of:
 a presence of the given latent feature within the comparison task;
 absence of the given latent feature within the comparison task.

6. The method of claim 5, wherein the given latent biasing feature within the set of latent biasing features $x_{kij}$ corresponds to:
 a first value if the given latent feature is present within the first object only;
 a second value if the given latent feature is present within the second object only;
 a third value if the given latent feature is present within both, or absent in both the first object and the second object.

7. The method of claim 1, wherein the unbiased preference parameter is indicative of an actual preference of the given assessor that is not affected by the set of latent biasing features.

8. The method of claim 1, further comprising aggregating one or more unbiased preference parameters each associated with a respective assessor of the plurality of human assessors.

9. The method of claim 8, wherein the MLA is a first MLA, and the method further comprising using the aggregated one or more unbiased preference parameters for training a second MLA.

10. The method of claim 1, wherein which one of the set of latent biasing feature has the possibility of affecting preference perception of the first object over the second object is a priori unknown.

11. A system for selecting a label from a plurality of labels received for a comparison task executed within a computer-implemented crowd-sourced environment, the system comprising a server, the server comprising a processor configured to:
 receive the plurality of labels having been selected by a plurality of assessors of the computer-implemented crowd-sourced environment, each of the label included within the plurality of labels being indicative of a given assessor's perceived preference of a first object of the comparison task over a second object of the comparison task;
 analyze the comparison task to determine a set of latent biasing features associated with the first object and the second object, the set of latent biasing features comprising one or more latent features within the comparison task having a possibility of affecting preference perception of the first object over the second object by at least a portion of the plurality of human assessors;
 train a Machine Learning Algorithm (MLA) to determine an unbiased preference parameter based on a respective latent score parameter for the first object and the second object, a predicted bias probability parameter for the given assessor and a predicted bias degree parameter for the given assessor;
 execute the MLA, the MLA being configured to, for the given assessor of the plurality of human assessors, a generative process to:
  generate the respective latent score parameter for the first object and the second object, the respective latent score parameter indicative of a probable offset between the given assessor's perceived preference and an unbiased preference parameter of the first object over the second object, the probable offset being due to at least some of the set of latent biasing features;
  generate the predicted bias probability parameter for the given assessor, the predicted bias probability parameter being indicative of a probability that the given assessor's perceived preference is one of biased and unbiased;
  generate the predicted bias degree parameter for the given assessor, the predicted bias degree parameter being indicative of a degree of bias that the given assessor has towards the set of latent biasing features;
 wherein:
  the MLA is trained to generate the respective latent score parameters, the predicted bias probability parameter and the predicted bias degree parameter based on a logarithmic formula:

$$\mathcal{L} = \sum_{(w_k, d_i, d_j) \in P}^{\infty} \log[f(\gamma_k)f(s_i - s_j) + (1 - f(\gamma_k))f(\langle x_{kij}, r_k \rangle)]$$

wherein:
 L is a likelihood of observed comparison under the generative process based on the latent score parameter of the objects, bias probability parameter and bias degree parameter for each assessor;
 $w_k$ is the given assessor;
 $d_i$ is the first object from the comparison task for the given assessor $w_k$ which was preferred over the second object $d_j$;
 P is the plurality of labels selected by the plurality of assessors;
 $\gamma_k$ is the predicted bias probability parameter;
 $s_i$ and $s_j$ correspond to the latent score parameter of the first and second object respectively, the unbiased preference parameter being a logistic function of their difference;
 $x_{kij}$ is the set of latent biasing features;
 $r_k$ is the predicted bias degree parameter;
 maximize the logarithmic formula by a maximizing formula:

$$T = \mathcal{L} + \lambda R = \sum_{(w_k, d_i, d_j) \in P}^{\infty} \log[f(\gamma_k)f(s_i - s_j) + (1 - f(Y_k))f(\langle x_{kij}, r_k \rangle)] + \lambda \sum_{i=j}^{N} \log(f(s_i - s_0)) + \log(f(s_0 - s_i))$$

wherein:
 T is a target function that is maximized;
 λ is a regularization parameter;
 R is a regularization term;
 $S_o$ is a latent score parameter of a virtual object; and
 generate the unbiased preference parameter based on the logistic function of the respective latent score parameters;

use the unbiased preference parameter as the label for the comparison task for the given assessor.

12. The system of claim 11, wherein the comparison task is a pairwise comparison task.

13. The system of claim 11, wherein the processor is configured to analyze the comparison task prior to receiving the plurality of labels.

14. The system of claim 13, wherein the set of latent biasing features include at least one of:
- a font size associated with the first object and the second object respectively;
- an image size associated with the first object and the second object respectively; and
- a positioning associated with the first object and the second object respectively.

15. The system of claim 14, the processor being further configure to:
for a given latent biasing feature included within the set of latent biasing feature, generate a latent feature vector, the latent feature vector being indicative of at least one of:
- a presence of the given latent feature within the comparison task;
- absence of the given latent feature within the comparison task.

16. The system of claim 15, wherein the given latent biasing feature within the set of latent biasing features $x_{kij}$ corresponds to:
- a first value if the given latent feature is present within the first object only;
- a second value if the given latent feature is present within the second object only;
- a third value if the given latent feature is present within both, or absent in both the first object and the second object.

* * * * *